(12) United States Patent
Chand et al.

(10) Patent No.: US 9,428,423 B2
(45) Date of Patent: Aug. 30, 2016

(54) SELF-BONDING OF CHEMICALLY VAPOR DEPOSITED SIC ARTICLES

(71) Applicant: Advanced Bonding Technology, Inc., Amherst, NH (US)

(72) Inventors: Alina Chand, Paxton, MA (US); Ronald H. Chand, Paxton, MA (US); Stephen G. DiPietro, Mont Vernon, NH (US); Vimal K. Pujari, Northborough, MA (US)

(73) Assignee: Advanced Bonding Technologies, Inc., Amherst, NH (US)

( * ) Notice: Subject to any disclaimer, the term of this patent is extended or adjusted under 35 U.S.C. 154(b) by 235 days.

(21) Appl. No.: 14/269,621

(22) Filed: May 5, 2014

(65) Prior Publication Data

US 2014/0326403 A1 Nov. 6, 2014

Related U.S. Application Data

(60) Provisional application No. 61/818,945, filed on May 3, 2013.

(51) Int. Cl.
| | |
|---|---|
| C04B 41/00 | (2006.01) |
| C04B 35/571 | (2006.01) |
| C04B 35/573 | (2006.01) |
| C04B 35/645 | (2006.01) |
| C04B 37/00 | (2006.01) |

(52) U.S. Cl.
CPC ............ *C04B 35/571* (2013.01); *C04B 35/573* (2013.01); *C04B 35/645* (2013.01); *C04B 37/001* (2013.01); *C04B 2235/6562* (2013.01); *C04B 2235/6565* (2013.01); *C04B 2235/6567* (2013.01); *C04B 2235/6581* (2013.01); *C04B 2235/661* (2013.01); *C04B 2235/767* (2013.01); *C04B 2235/963* (2013.01); *C04B 2237/365* (2013.01); *C04B 2237/52* (2013.01)

(58) Field of Classification Search
CPC . C04B 35/571; C04B 35/573; C04B 35/645; C04B 37/001; C04B 2235/6562; C04B 2235/6565; C04B 2235/6567; C04B 2235/6581; C04B 2235/661; C04B 2235/767; C04B 2235/963; C04B 2237/365; C04B 2237/52

See application file for complete search history.

(56) References Cited

U.S. PATENT DOCUMENTS

| | | | | |
|---|---|---|---|---|
| 4,762,269 | A | * | 8/1988 | Gyarmati ............... C04B 35/645 156/89.17 |
| 5,683,028 | A | * | 11/1997 | Goela ...................... B23K 1/19 228/121 |
| 2014/0311111 | A1 | * | 10/2014 | Wolff ..................... B01J 27/224 55/523 |

* cited by examiner

*Primary Examiner* — Jacob T Minskey
*Assistant Examiner* — Vishal I Patel
(74) *Attorney, Agent, or Firm* — Davis & Bujold, P.L.L.C.; Kimberly A. Peaslee

(57) ABSTRACT

Method and system for bonding two or more CVD SiC articles together without the use of interface materials using applied forces from about 0.0035 MPa to about 0.035 MPa. The articles are pretreated for bonding. Graphite or other fixtures are used to apply forces in a vacuum or inert gas environment. Temperatures from about 1900° C. to about 2200° C. are used to initiate a $\beta \rightarrow \alpha$ transition in the SiC to create bonded CVS SiC articles.

20 Claims, 8 Drawing Sheets

- 9 micron Diamond Polish
- Differential Interference Contrast
- Note Presence of Grain Growth and Isolated Porosity Across Interface
- Applied Pressure Approximately 7 kPa (1 psi)

- As-Received (Approx 200 Grit Diamond Ground) Finish
- Note Presence of Grain Growth and Isolated Porosity Across Interface
- Applied Pressure Approximately 7 kPa (1 psi)

SELF-BONDING OF CHEMICALLY VAPOR DEPOSITED SIC ARTICLES

CROSS REFERENCE TO RELATED APPLICATIONS

This Application claims the benefit of U.S. Provisional Application No. 61/818,945, filed May 3, 2013, the content of which is incorporated by reference herein in its entirety.

FIELD OF THE INVENTION

The present invention relates to a method of solid-state bonding of high purity silicon carbide (SiC) made via chemical vapor deposition (CVD) and to the articles made with such methods. More specifically, the present invention provides a method for efficient and cost-effective bonding of CVD SiC articles in a manner that enables fabrication of structural and functional articles heretofore unachievable using conventional high purity CVD SiC synthesis techniques.

BACKGROUND OF THE INVENTION

The covalent nature of the silicon-carbon bond imparts the intrinsic source of the mechanical strength and stiffness of SiC articles, and accounts for the low self-diffusivity of silicon and carbon atoms in SiC over a very wide temperature range. This is especially the case for high purity CVD SiC. This property also plays a dominant role in establishing the difficulty with which the SiC can be bonded to itself as well as to other ceramics and metals.

The CVD process can produce a condensed form of SiC via the decomposition of as phase reactants at comparatively low temperatures, e.g., 1100° C.-1400° C., without the use of any sintering or other densification aids. This implies that high purity SiC can be produced by this synthesis route. Indeed CVD SiC is a particularly desirable form of SiC, producing articles having properties including, but not limited to, essentially zero porosity, extremely high purity (>99.9995%), no need for second phases or sintering aids, and a very wide range of possible resultant component shapes.

Typically, methyltrichlorosilane (CH—SiCl$_3$), or ethyltrichlorosilane (C$_2$H$_5$SiCl$_3$) gas, employed with hydrogen as a carrier gas, is employed as a gas phase route for the synthesis of bulk, often very high purity, CVD SiC articles. The CVD SiC is typically synthesized by gas phase decomposition of gaseous precursors according to the following reaction paths:

CH$_3$SiCl$_3$+H$_2$→SiC+3HCl (for MTS)

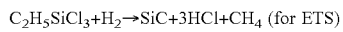

C$_2$H$_5$SiCl$_3$+H$_2$→SiC+3HCl+CH$_4$ (for ETS)

Deposition rates are generally fairly slow (on the order of 0.0025 cm per hour), and crystalline microstructures tend to be columnar in morphology, with the grains being smaller at the onset of deposition and then growing larger as preferred crystalline variants begin to grow in the thickness direction. Given the deposition temperatures. CVD SiC is essentially composed entirely of β-phase material.

A phase transformation from β-SiC to α-SiC occurs upon heating, with undoped β-SiC transforming to 6H and 15R in the vicinity of 2000° C., and the 15R polytype being a metastable phase that transforms to 6H. Doping β-SiC with boron lowers the transformation temperature and promotes formation of the 4H polytype. On the other hand, doping with nitrogen prevents the formation of 4H and stabilizes the 6H. The β→α phase transformation is irreversible at ambient pressures. However, under pure nitrogen atmosphere, the transformation can be reversed and β-SiC phase can be stabilized up to 2500° C. by applying processing in nitrogen ambient atmospheres. At atmospheric pressure and temperatures exceeding 2000° C., pure silicon, carbide does not melt, but sublimes or dissociates.

Referring to FIG. 1, a representation of α-SiC (a) vs. β-SiC Crystal Structure (b) is shown. The density if SiC for all polytypes is 3.21 g/cc and SiC has a melting (actually decomposition) point of 2730° C. As a general matter, CVD SiC has several desirable engineering attributes including, but not limited to: CVD SiC has high hardness in the range of 2200-2500 kg/mm$^2$; CVD SiC has a high elastic modulus of 400-460 GPa; CVD SiC possesses excellent dimensional stability and stiffness as well as outstanding polishing characteristics (e.g., polishability to <3 Å RMS); CVD SiC has a low coefficient of thermal expansion (CTE) (e.g., 2.2-4.5× 10$^{-6}$/C from RT to 1500° C.); CVD SiC has excellent elevated temperature strength retention characteristics (e.g., flexural strengths of typically 400-420 MPa at room temperature, while peaking at strengths of 550-580 MPa at temperatures in the vicinity 1400° C.); and CVD SiC has excellent thermal conductivity (e.g., 100-300 W/m-K including for certain doped grades (e., Dow Chemical CVD SiC®)).

In part for these reasons, CVD SiC has filled important, growing product niches in demanding technical applications, which include tactical and spaceborne IR/optical mirrors, laser galvanometers semiconductor wafer carrier components and specialty heat sink components. Applications for the bonded SiC articles of the present invention can be anticipated in the semiconductor, optics, optoelectronics, petrochemical, nuclear energy realms, and the like.

In spite of its favorable overall mix of technical properties CVD SiC has some engineering and practical shortcomings, which include but are not limited to: CVD SiC is difficult to make into bonded structures (particularly to itself), due to its low lattice and boundary self-diffusion coefficients (D$_{lattice}$~2.62±1.83×10$^8$ {−8.72±0.14 ev/atom/kT}cm$^2$ sec$^{-1}$; D$_{boundary}$~4.44±2.03×10$^7$ {−5.84±0.09 ev/atom/kT}cm$^2$ sec$^{-1}$). See, for example, Hon, M. H., and Davis, R. F., "Self-Diffusion of 14C in Polycrystalline —SiC," Journal of Materials Science, 14 (1979) 241-2421. It is possible to bond CVD SiC members to themselves by making use of methods which may employ refractory metallic foils (i.e., Zr, Ti, Mo, etc) or pre-ceramic silazane-type polymers, but such methods will impose significant limitations on the temperature capability of the bonded structures due to formation low-melting point eutectic phases such as TiSi$_2$ (melting point: 1470° C.) or otherwise due to the intrinsic performance limitations (decomposition, loss of elevated temperature strength, etc.) of the joint material itself.

Conventionally grown CVD SiC has thickness limitations (e.g., ~1-2 cm) associated with the accumulation of residual stress for thick deposits. It is in fact sometimes observed that deposits of over 1.2 cm-1.3 cm thickness can spontaneously fracture due to buildup of crystalline growth stress, greatly complicating the machining and fabrication of thick articles. This is an unfortunate aspect of CVD SiC fabrication, as there is demand for thick articles having complex geometrical features for applications such as the semiconductor and lightweight optics industries.

Current methods, as in U.S. Pat. No. 4,925,608, for example, teach joining sintered α-phase silicon carbide via a hot isostatic press (HIP) diffusion banding method. The method entails polishing surfaces to a mirror finish with diamond abrasives, fitting the surfaces together to form a composite structure, and then subjecting the composite structure to HIP processing (pressure-assisted diffusion bonding) under conditions that promote plastic deformation and diffusion flow at the bonding interface. While capable of producing well bonded and geometrically consistent metallic encapsulation layers, this method is costly and limited with regard to its ability to accommodate complex shapes. Difficulties with transition to huge-scale manufacturing is also seen, as expensive restraint tooling and access to HIP furnaces is required, thus limiting applications of this method to simple geometries in applications that are not cost-sensitive.

Another current method, as in U.S. Pat. No. 5,683,028, teaches joining CVD SiC via the use of geometrically profiled male and female joint members enclosing a gap, which is approximately 0.076 cm in width. There, the female joint also has a reservoir provided which accepts a volume of molten Si during infiltration and wicking of liquid Si into the joint region during thermal processing at temperatures of approximately 1410° C. (the melting point of Si). Following liquid Si infiltration, the region joined by molten Si is allowed to solidify and is then overcoated with a layer of CVD SiC to isolate the silicon-bonded region at the interface. This method, while capable of providing a joint with high strength, is procedurally complex, costly, and would impose thermal limitations on the joined parts, given that the melting point of silicon is 1410° C. Thus, in cases where use of the bonded article is required above the melting point of Si, the method would cause excessive weakening of the joint due to plastic deformation and liquid phase formation. Additionally, excessive oxidation at temperatures over 1300° C. would result due to the presence of Si-rich regions in the joint. This method would also not be particularly suitable for use in a field-expedient setting such as might be required for repairing or joining subassemblies.

Additionally, U.S. Pat. No. 4,961,529 teaches a method for joining SiC (type not specified) in a fashion somewhat similar to U.S. Pat. No. 5,683,028, making use of geometrically profiled male and female joint members, but with an imposed layer of titanium carbosilicide ($Ti_3SiC_2$). There, a thin layer of $Ti_3SiC_2$ is made by sputtering or by mixing powders of $TiC_{0.8}$ and $TiSi_2$, and the layer is interposed between the profile SiC articles to be joined, which are pre-machined and highly polished. In that method, the actual bonding process occurs by vacuum hot pressing the articles to be joined at temperatures in the 1450° C.-1500° C. range. This method is procedurally complex and costly, while also being limited to joining articles that can be accommodated within a hot press die set, thus severely hampering practical applications to complex or large assemblies. Additionally, excessive oxidation and plastic deformation at temperatures over 1200° C. would also be likely due to the presence of the titanium carbosilicide bond phase. Additionally, the $Ti_3SiC_2$ phase has a significantly different elastic modulus and coefficient of thermal expansion (CTE) as compared to pure SiC, which would exacerbate accumulation of undesirable elastic and plastic strains in the joined articles—particularly in a cyclic stress or temperature environment. Just as the methods previously discussed, the techniques described in U.S. Pat. No. 4,961,529 would not be compatible with use in a field-expedient setting such as might be required for repairing or joining SiC subassemblies.

It is recognized that major deficiencies remain with state of the art methods used to bond SiC-based ceramics, and especially CVD SiC. Accordingly, there is a need to develop a method to bond CVD SiC in a manner that is less complicated, less costly, capable of working with a wide range of component sizes and geometries, and is also compatible with the requirements of reproducible and large-scale manufacturing.

SUMMARY OF THE INVENTION

It has been recognized that there is a need for joining high purity chemical vapor deposited CVD SiC to produce CVD SiC articles in a manner that is cost-effective, while producing joints comparable in strength to the base material itself such as are seen in the method and system of the present invention.

One aspect of the present invention is a method of bonding a plurality CVD SiC articles together, comprising providing a furnace; providing a plurality CVD SiC articles to the furnace, wherein the effective separation between the interfaces of the articles is approximately 20 micron or less; applying forces from about 0.0035 to about 0.035 MPa the interfaces of the articles to be bonded; processing at temperatures ranging from about 1900° C. to about 2200° C.; and initiating a $\beta \rightarrow \alpha$ SiC phase transformation, thereby bonding the SiC articles together.

One embodiment of the method of bonding a plurality CVD SIC articles together is wherein the interfaces of the articles have flatnesses from about 0.0013 to about 0.025 cm.

One embodiment of the method of bonding a plurality CVD SIC articles together further comprises the step of degreasing the articles with an alkaline solutions.

One embodiment of the e method of bonding a plurality CVD SIC articles together further comprises the step of cleaning the articles with an acidic solution.

One embodiment of the method of bonding a plurality CVD SIC articles together is wherein the acidic solution comprises 30% HF/70% $HNO_3$ at 40% strength in DI H2O.

One embodiment of the method of bonding a plurality CVD SIC articles together further comprises the step of generating of vacuum of 100 mBar or less in the furnace.

One embodiment of the method of bonding a plurality CVD SIC articles together is wherein the step of processing includes ramping from RT to 2150°C. at 10° C./min.

One embodiment of the method of bonding a plurality CVD SIC articles together further comprises the step or backfilling the furnace with 500-700 mBar inert gas.

One embodiment of the method of bonding a plurality CVD SIC articles together further comprises the step of holding the temperature at about 2150° C. for about 15 minutes.

One embodiment of the method of bonding a plurality CVD SIC articles together further comprises the step of ramping from about 2150° C. to about 1950° C. at 10° C./min.

One embodiment of the method of bonding a plurality CVD SIC articles together further comprises the step of holding the temperature at about 1950° C. for about 2 hrs to about 4 hrs.

One embodiment of the method of bonding a plurality CVD SIC articles together further comprises cooling the articles at a natural decay rate for the furnace.

One embodiment of the method of bonding a plurality CVD SIC articles together is wherein the step of applying forces comprises applying mechanical pressure with one or more graphite fixtures.

One embodiment of the method of bonding a plurality CVD SIC articles together is wherein the step of applying forces comprises mechanical pressure with one or more springs.

One embodiment of the method of bonding a plurality CVD SIC articles together is wherein the graphite has a CTE of at least $4.5 \times 10^{-6}$ $C^{-1}$.

One embodiment of the method of bonding a plurality CVD SIC articles together is wherein there are interface materials present between the interfaces of the articles to be bonded.

Another aspect of the present invention is a method of bonding a plurality CVD SiC articles together, comprising providing a furnace; providing a plurality CVD SiC articles to the furnace, wherein the effective separation between the interfaces of the articles is approximately 2.0 micron or less; applying forces from about 0.0035 to about 0.035 MPa its the interfaces of the articles to be bonded with one or more graphite fixtures; processing at temperatures ranging from about 1900° C. to about 2200° C.; and initiating a β→α SiC phase transformation, thereby bonding the SiC articles together.

One embodiment of the method of bonding a plurality CVD SIC articles together is wherein the graphite has a CTE of at least $4.5 \times 10^{-6}$ $C^{-1}$.

One embodiment of the method of bonding a plurality CVD SIC articles together is wherein there are no interface materials present between the interfaces of the articles to be bonded.

One embodiment of the methods of bonding a plurality CVD SIC articles together is wherein the processing at temperatures step compromises a two-step sintering regime.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION Of THE PREFERRED EMBODIMENTS

Figure 1:
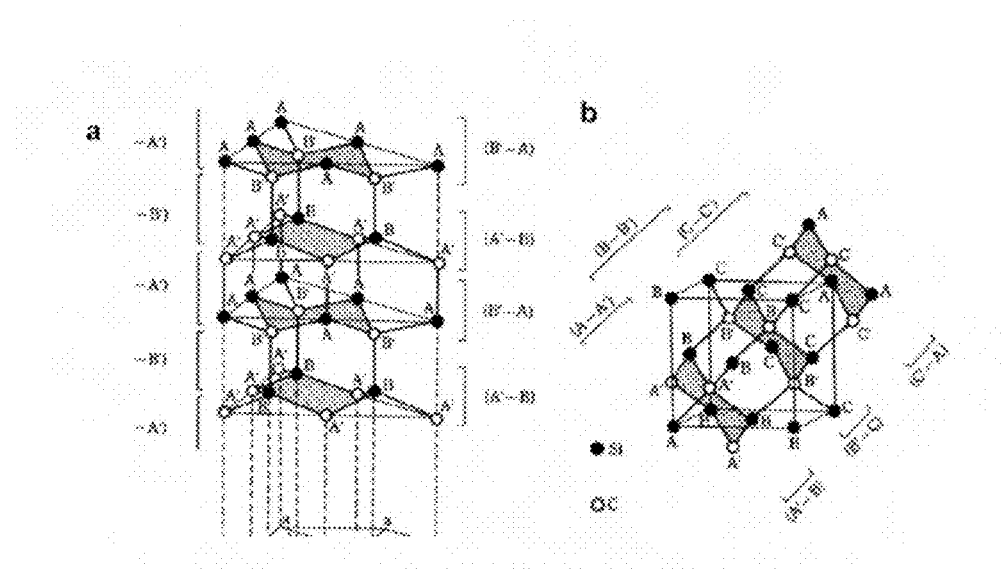
FIG. 1 shows a representation of α-SiC (a) vs. β-SiC crystal structure (b).

One embodiment of the present invention relates to a method for the solid-state bonding of high purity SiC made via chemical vapor deposition (CVD) and to the articles made with such methods. Specifically, it relates to a method to efficiently and cost-effectively bond CVD SiC articles in a manner that will enable fabrication of structural and functional articles heretofore unachievable using conventional high purity CVD SiC synthesis techniques. Applications for this class of bonded SiC materials can be anticipated in the semiconductor, optics, petrochemical and nuclear energy realms.

The bonding method of the present invention can mitigate or eliminate many prior limitations and engineering difficulties associated with diffusion, braze, melt infiltration, transient liquid phase bonding, and the like. No special chemical, metallic or pre-ceramic polymeric additives are required to affect bonding of CVD SiC by the method of the present invention. In certain embodiments of the present invention, no highly specialized or unusual high-pressure processing equipment such as a vacuum hot press or hot isostatic pressing of components is needed. In certain embodiments, graphite jigs and assemblies can be used to hold CVD SiC components together in order to be bonded. In certain embodiments, the faying surfaces must be machined in a precise and controlled manner. In certain embodiments, the surfaces must be "activated" in the proper manner.

In certain embodiments of the present invention, the joints are bound without the use of interphase material, such as metallic foils, ceramic or metallic pastes, solders, eutectic forming brazes, and the like. In certain embodiments the method is a highly reproducible and cost-effective method for bonding of hundreds or thousands of CVD SiC articles in one bonding run under routinely achievable process conditions without use of toxic precursors or byproducts.

In certain embodiments of the method of the present invention, the method produces joined CVD SiC articles having excellent dimensional stability and low residual stress, as well as good strength and oxidation characteristics to temperatures exceeding 1600° C. In certain embodiments, CVD SiC articles are joined at low applied force (<0.01 MPa, thus eliminating the need for application of high pressures at the joint interface such as would be provided with a vacuum hot press or HIP unit. In certain embodiments, low-pressure diffusion bonding of CVD SiC articles is accomplished for articles that have been mechanically affixed or otherwise mechanically bonded to other structural elements or other support members such as might be encountered in a semiconductor facility or power plant, thus simplifying installation and replacement procedures for complex assemblies in field settings.

The SiC bonding technology of the present invention has worked quite successfully thus far on a number of CVD SiC articles ranging in thickness from about 1-2 cm with projected joint areas of about 20 cm². In certain embodiments, any suitable graphite restraint fixture which can produce anywhere from 0.0035 MPa to 0.035 MPa applied pressure to the mechanical interface can be used for bonding of CVD SiC using processing methods described herein. In certain embodiments, varying grades of monolithic graphite are chosen, such as Entegris/POCO AXF 5Q, POCO TRA-1, POCO ZXF-Q, Morgan AMT M-555, Morgan AMT M-303, Carbone Lorraine 2230, and the like. In certain embodiments, graphite can be employed to apply mechanical pressure to the stack of articles given that differences in coefficient of thermal expansion (CTE) can generate compressive forces in a properly designed fixture. Bonding trials conducted thus far have shown that graphite grades having a CTE in the range of approximately $4.5 \times 10^{-6}$ $C^{-1}$ and greater, along with strengths of 50 MPa and greater, are sufficient for generating clamping pressure sufficient to effect bonding of CVD SiC articles.

Since the contact pressures needed for bonding are very modest (0.01-0.1 MPa), the method of the present invention of bonding is limited only by the size of available graphite vacuum furnaces, some of which are over 3 m in diameter and height. No fundamental scale-up issues are anticipated, and it is likely that the technology itself can be transitioned into a bonding approach that would be portable or otherwise field-expedient, thus greatly enhancing prospects for construction, repair and integration of large CVD SiC structural assemblies.

In certain embodiments of the present invention, intimate contact and bonding, the degree of which can be controlled by suitable application of surface conditioning, low mechanical pressure and thermal processing parameters, is brought about via simultaneous combination of applied temperature and applied pressure in a vacuum/inert gas furnace environment. In certain embodiments, the low pressure diffusion bonding conditions needed to bond the CVD SIC members together are dictated by the projected areas of the surfaces to be joined, as well as the technical requirement to heat the articles to temperatures which cause the β→α SiC phase transformation to occur (approximately 2000° C.).

It is believed that processing at temperatures sufficient to initiate the β-SiC to α-SiC phase transformation are in fact necessary to stimulate diffusional activity and grain growth across the interface of the CVD SiC articles to be bonded. In other words, the primary bonding mechanism is driven by occurrence of the solid-state β→α phase transformation, promoting formation of elongated α grains. In certain embodiments of the present invention, a two-step "sintering" regime is employed in order to suppress exaggerated grain growth in the α phase, which could lead to loss of strength at the joint.

Figure 2:
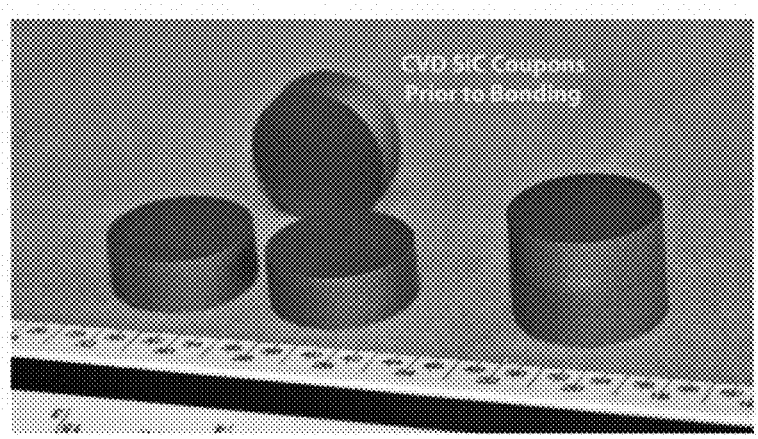
FIG. 2 shows a photo of one embodiment CVD SiC cylindrical coupons of the present invention prior to joining.

In certain embodiments of the present invention, the method begins with preparation of the CVD SiC articles. Referring to FIG. 2, a photo of one embodiment of CVD SiC cylindrical coupons of the present invention prior to joining are shown. In one example, the starting material was plate stock, or shaped articles of CVD SiC, which may be obtained from commercial vendors such as Dow Chemical, Morgan Advanced Ceramics, Trex Enterprises, or the like. Typically, the stock obtained for joining was in the range of 1-2 cm, but there is no fundamental reason why much thinner or thicker sections could not also be joined, depending on specific application requirements.

In one embodiment, the surfaces to be joined were diamond ground with resin-bonded wheels ranging from 180-320 mesh. It was found that there is no need to diamond lap or polish the surfaces to submicron tolerances, and indeed, there was some evidence to suggest that "mirror-polished" surfaces were less amenable to bonding than the "as-received" diamond machined surfaces. Applicants' data suggests that asperities, or surface roughness, on the bonding surfaces, in conjunction with the micro-damage created by grinding, may assist in diffusional flow at the interface. Asperities could essentially serve to raise the effective contact pressure between grains, even at low macroscopic contact pressures. These features could thus serve to stimulate bonding via generation of some plastic strain at grain-to-grain contact points. The micro-damage created by diamond grinding may further promote bonding in a fashion that is qualitatively similar to the stored energy of cold work in crystalline grains during solid-state sintering.

Experimental evidence further suggests that the faying surfaces need to be brought to approximately a 20 micron separation or less, thus ensuring that there are no excessive gaps at the interface. Such tolerances are readily achievable with proper machining techniques. In certain embodiments, final preparation of the CVD SiC surfaces entailed cleaning with an alkaline (e.g., sodium hydroxide+hydrogen peroxide, ammonium hydroxide+hydrogen peroxide, or the like) solution to remove oils and greases from prior machining and handling. In certain embodiments, just prior to insertion of the articles to be joined in a suitable vacuum furnace, the articles to be bonded were acid etched in acidic (e.g., nitric+hydrofluoric acid; sulfuric acid+hydrogen peroxide, or the like) solution to remove remnant silica films, therefore allowing one to obtain the cleanest possible surface prior to joining.

Figure 3:
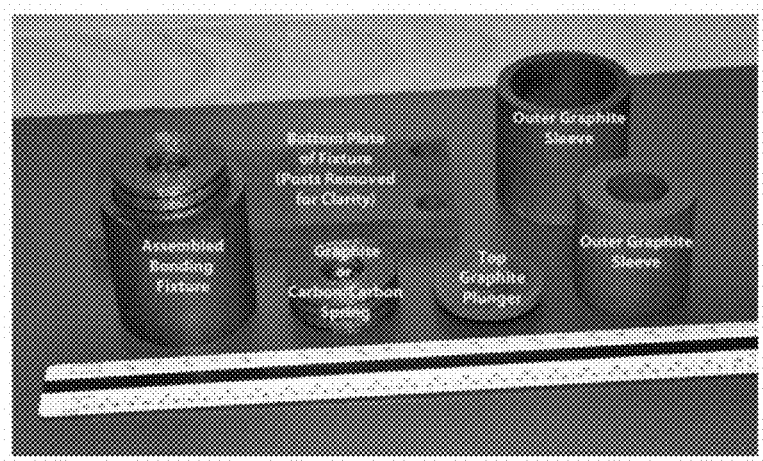
FIG. 3 shows a photo of one embodiment of a graphite fixture used for the joining of cylindrical CVD SiC parts of the present invention.
Figure 4:
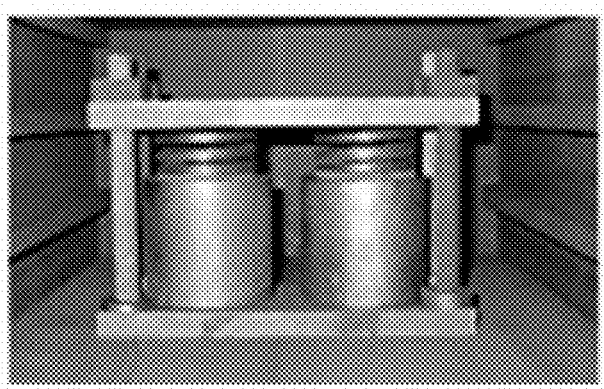
FIG. 4 shows a photo of one embodiment of an assembled graphite fixture of the present invention used for bonding CVD SiC parts.

In certain embodiments, the fixture used to bond the CAM SiC articles is composed of any suitable graphite apparatus which can produce pressures in the range of 0.01-0.1 MPa applied pressure to the mechanical interface. Referring to FIG. 3 and FIG. 4, photos of embodiments of a fixture used for the joining of cylindrical CVD SiC parts of the present invention are shown both unassembled and assembled. In certain embodiments, a graphite fixture is used to bond cylindrical articles, wherein the articles are stacked up in a graphite sleeve assembly, which serves to center the parts and restrain radial movement during thermal processing. In certain embodiments of the present invention, pressure is then applied its the parts via a graphite plunger which is forced down by carbon/carbon or graphite springs capable of generating the mechanical forces mentioned herein. See, for example, FIG. 9. In certain embodiments, grades of monolithic graphite are chosen (such as Entegris/POCO AXF 5Q and the like), which can be employed to apply mechanical pressure to the stack of articles, given that differences in coefficient of thermal expansion (CTE) can generate compressive forces in as properly designed fixture employing graphite structural members with a strength of at least 50 MPa.

In certain embodiments, arrays of springs or high CTE graphite plungers may also be employed in combination to selectively apply mechanical pressure to smaller areas on a large surface, or used in such a manner to apply force additively to a large surface area requiring bonding. In certain embodiments, the method of the present invention can be used for joining honeycomb or triangular core elements of the type required for fabrication of lightweight CVD SiC optical or IR mirrors, thus eliminating the need to machine massively thick and costly starting articles to the desired final configuration.

In certain embodiments, once fixtured, CVD SiC parts to be joined are placed in a graphite vacuum furnace and subjected to the processing schedule presented in Table 1.

Table 1: Surface Preparation and Thermal Processing Schedule for CVD SiC Joining Step 1: Grind interfaces for joining with resinoid diamond #220 mesh wheel or similar. (0.0013-0.025 cm flatness required.)

Step 2: Thoroughly clears surfaces with degreasing solvents followed by nitric acid+HF (30% HF/70% $HNO_3$ at 40% strength in DI $H_2O$) chemical cleaning of parts.

Step 3. Assemble components to be bonded in fixture providing approximately 0.01-0.1 MPa of pressure at faying surfaces.

Step 4. Insert components be bonded in graphite vacuum furnace

Evacuate furnace to base pressure of 100-1000 mBar or less.

Ramp temperature from room temperature to 1650° C. at rates of 0.1° C./hr to 500° C./hr Hold at 1650° C. for 1-5 hrs while under at pressure of 100-1000 mBar to effect removal of remnant $SiO_2$ films on surfaces to be bonded.

Ramp from 1650° C. to 2150° C. at 10° C./min; backfill furnace with anywhere from 100-1000 mBar, high purity argon gas for remainder of run.

Hold at 2150° C. for 15 minutes while maintaining pressure on parts.

Ramp from 2150° C. to 1950° C. at 10° C./min.

Hold at 1950° C. for 2-4 hrs depending on size of components.

Cut power and cool at natural decay rate for furnace.

Step 5: Vent and unload once contents are below about 177° C.

In certain embodiments of the present invention, the applied pressure was approximately 0.007 MPa. Significant evidence for the occurrence of grain growth and recrystallization across the joined CVD SiC interfaces was seen. It has also been noted that relatively small amounts of porosity (15% or less as seen in FIG. 5, for example) remain at the bonding interface, whether the faying surfaces are diamond polished with 9 micron lapping films, or resinoid diamond ground to a finish achieved with 200 mesh wheels (See, for example, FIG. 6).

Figure 5:
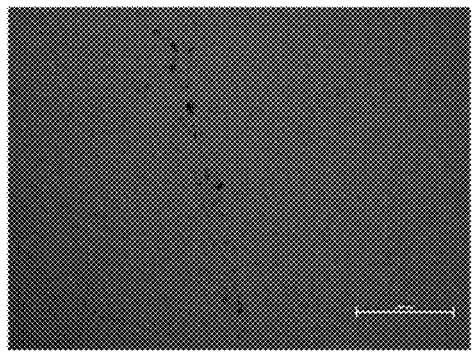
FIG. 5 shows an optical micrograph of one embodiment of a self-bonded CVD SiC joint region of the present invention.
Figure 6:
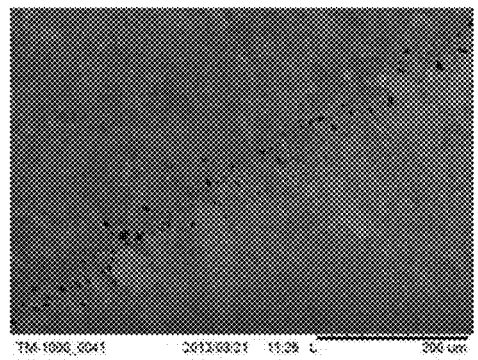
FIG. 6 shows a scanning electron micrograph (SEM) of one embodiment of a self-bonded CVD SiC joint region of the present invention.

Referring to FIG. 5 and FIG. 6, respectively, optical and SEM micrographs show clear evidence of a metallurgical and chemical bond between the CVD SiC surfaces. It is hypothesized that increased mobility of the atoms during the $\beta-\alpha$ phase transformation enhances diffusional mobility and grain growth at the joint interface, thus providing a mechanism to promote bonding and near elimination of porosity. In certain embodiments of the present invention, the bonded articles had room temperature flexural (per ASTM C1161) of 300-330 MPa, or approximately 60-70% of the base material's properties. In certain embodiments of the present invention, the bonded articles had a thermal conductivity (ASTM E1461 laser flash) of 240-270 w/m-K, perpendicular to the bonded faces, which is 90-95% of the base material's properties. In certain embodiments of the present invention, the bonded articles had an electrical conductivity of from about $7 \times 10^{-2}$ to $>4 \times 10^{-3}$ Ω-cm, perpendicular to the bonded faces, which is 50-90% of the base material's properties.

Though the present invention has been described in connection with certain examples, those skilled in the art will recognize upon reading the foregoing description that many modifications and variations on the basic invention can be employed. For example, though the present invention refers to methods for bonding in a vacuum furnace, it will be understood that field expedient methods for bonding could be realized by construction of an apparatus (such as to clamshell furnace using microwave or resistance heating) with vacuum seals imposed around the articles to be joined. Such a construction could be especially useful in petrochemical or nuclear plant settings.

In certain embodiments of the present invention, bonding two CVD SiC articles together, using low applied forces 0.0035-0.035 MPa at the interfaces to be bonded uses no sintering aids, metallic foils or other adhesion promoters or wetting agents. In certain embodiments of the present invention, bonding two CVD SiC articles together, with a thermal processing cycle (at temperatures from 1900° C.-2200° C. causes initiation of the $\beta \rightarrow \alpha$ SiC phase transformation, thus promoting diffusional activity, $\alpha$ grain formation, and growth of $\alpha$ SiC grains across the interface.

In certain embodiments of the present invention, a two-step sintering cycle is employed in order to avoid exaggerated $\alpha$—phase grain growth in the CVD SiC interface region that is to be bonded. In certain embodiments of the present invention, diamond machining and/or polishing methods are used which result in effective separations of approximately 20 microns or less. In certain embodiments, carbon/carbon or graphite springs are used to hold the articles in place for bonding which are capable generating contact forces in the range of 0.0035-0.035 MPa at temperatures of 2150° C.

In certain embodiments of the present invention, arrays of springs or high CTE graphite plungers in combination are used to selectively apply mechanical pressure to smaller areas a large surface, thus permitting the construction or repair of multi-component CVD SiC subassemblies in building block fashion in field-expedient or repair settings. In certain embodiments, bonded CVD SiC articles of the present invention have high phase purity (99.9995% or better; equal to that of the starting material), dimensional stability and low residual stress (as witnessed in the ability to be diamond machined without fracture or spalling), as well as good strength and oxidation characteristics to temperatures exceeding 1600° C. (also equal to that of the base material), since the bonded interface contains no sintering aids, foils or other agents which can limit high-temperature strength and oxidation resistance.

Figure 7:
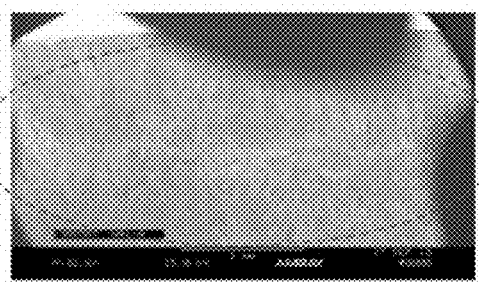
FIG. 7 shows an optical micrograph of one embodiment of a bonded CVD SiC article of the present invention.
Figure 7:
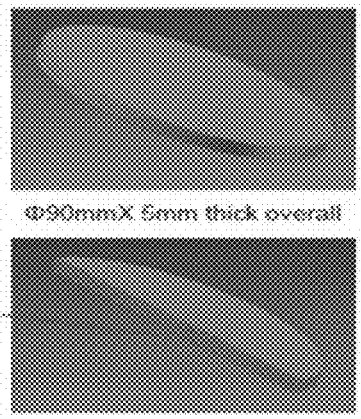
Figure 8:
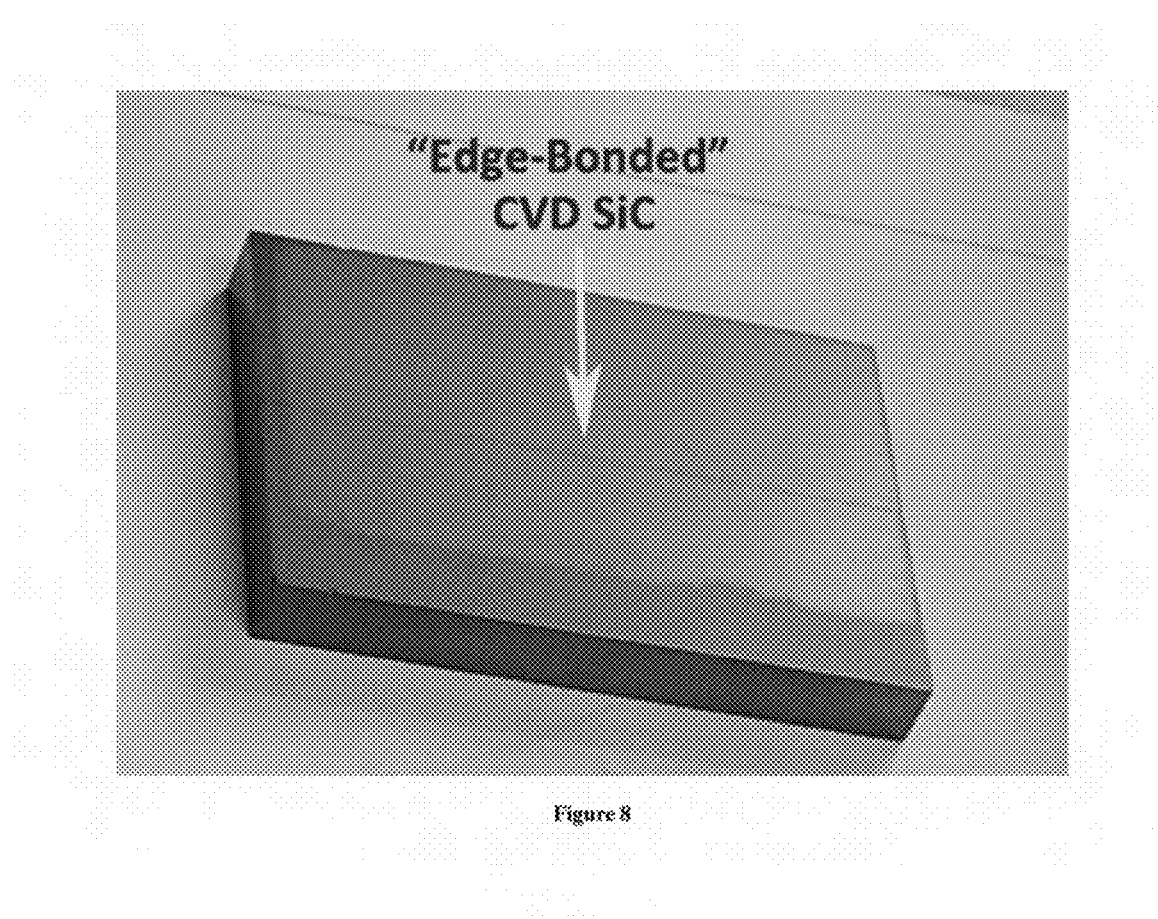
FIG. 8 shows a photograph of one embodiment of a bonded CVD SiC article of the present invention.

Referring to FIG. 7, an optical micrograph of another embodiment of the invention is shown; in this the bonded article comprises two flat cylindrical disks having been joined to each other. More particularly, the bonded disk was sectioned by electrical discharge machining (EDM), wherein the bonded article exhibiting machining characteristics essentially identical to that of the original unbounded CVD SiC material, thus indicating that electrical conductivity across the bonded interface was maintained. The bonded article was 90 mm diameter×5 mm thick. The bonded area is shown in this scanning electron micrograph at 33× magnification. It is seen that the bonded region is free of delaminations, and that there is evidence of grain growth across the interface, as seen more clearly in FIGS. 5 and 6. See also, FIG. 8.

Figure 9:
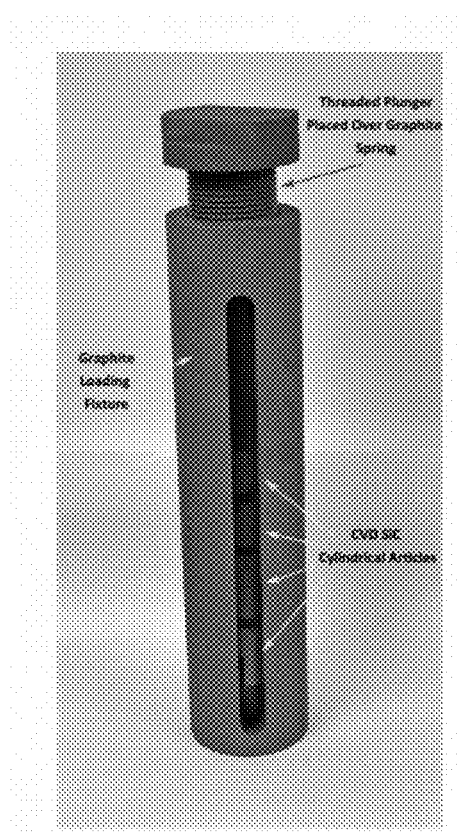
FIG. 9 shows a photograph of one embodiment of an assembled graphite fixture of the present invention used for bonding CVD SiC parts.
Figure 10:
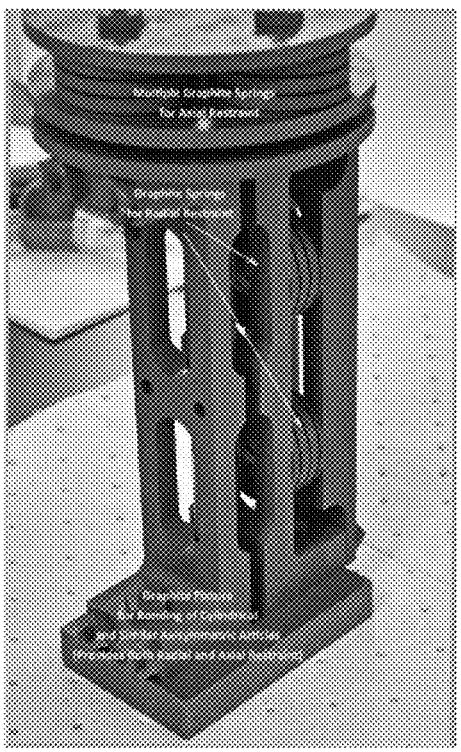
FIG. 10 shows a photograph of one embodiment of assembled graphite fixture of the present invention used for bonding CVD SiC parts.

Referring to FIG. 9 and FIG. 10, photographs of embodiments of graphite fixtures of the present invention are shown. More particularly, in certain embodiments springs are used to apply pressure. In certain embodiments, the fixture applies radial and axial restraint.

The bonding method of the present invention is simple to execute and scale up, given that the pressures required to bond the parts is so low. This greatly relaxes prior requirements associated with other solid-state diffusion bonding methods based on hot pressing or hot isostatic pressing (HIP), which generally entail use of high-pressures (>50-200 MPa) at the interface, thus entailing use of expensive graphite die sets, refractory metal hermetic containers (in the case of HIP). In certain embodiments of the present invention, the graphite restraint fixture must only be capable of applying at least 0.007 MPa at a temperature of 2150° C., which is easily achievable with graphite grades of the type previously mentioned.

Additionally, because the required bonding pressures are so low, there are almost no practical limits on the size of components that can be joined. This is an important consideration for deployment of lightweight spaceborne or airborne visible or infrared optics, where there is much interest in making large aperture optics (meaning greater detection efficiencies and enhanced collection) for ballistic missile detection, exoplanet detection, cruise missile or aircraft detection, and the like. Certain embodiments of the present invention will allow for creation of large monolithic or mosaic (multi-piece) structures, the latter of which is of interest for adaptive (wavefront correction) optics, and the like. Since smaller parts can be bonded together to make large mosaics, the cost of such structures will be significantly decreased, since it is quite expensive to make very large (>1 m diameter) CVD SiC furnaces, given the need for accurate control of temperature and precursor gas delivery in such furnaces.

Additionally advanced heat exchanger and fluidic applications may be possible using the present invention, since: (1) the high temperature strength retention characteristics of the bonded material will be nearly identical to that of the parent material because no metallic foils, solders, brazes or adhesives are used to effect bonding. The bonding agent is a crystalline variant of the base material itself; and, (2) the chemical resistance of the bonded material is expected to be identical to the base CVD SiC material, thus enabling use of the method in heat exchanger or chemical process industry applications involving the conveyance of strong acids or otherwise caustic/corrosive agents.

In certain embodiments, the ability to build bonded structures in "Lego Block" fashion will allow for fabrication of structures with internal blind channels and other features that would otherwise be impossible to obtain with slabs of monolithic CVD SiC. In this sense, the bonding method can be used to create laminated structures with very complex geometry, similar to those now being made in polymers, metals and ceramics with so called additive manufacturing or "3D printing" methods.

In certain embodiments, thick structures can be made by laminating thinner elements together, thus greatly reducing the technical risk and costs associated with production of thick CVD SiC articles. Thicker CVD SiC articles are of interest for a wide variety of chemical process industry, semiconductor, optical applications, and the like.

Additionally, since the thermal and electrical conductivity of the bonded CVD SiC articles retains about 65-70% of the original material thermal and electrical conductivity, additional applications can be envisioned for advanced "heat spreader" components requiring the removal of heat in the thickness direction—such as for high-power lasers, gas-cooled hypersonic structures and high-temperature thermoelectric power conversion. In certain embodiments, specialized heater structures of interest to the semiconductor process industry (e.g., as for annealing of ion implantation damage) may also now be possible using this bonding technology.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A method of bonding a plurality CVD SiC articles together, comprising
    providing a furnace;
    providing a plurality CVD SiC articles to the furnace, wherein the effective separation between the interfaces of the articles is approximately 20 micron or less;
    applying forces from about 0.0035 to about 0.035 MPa at the interfaces of the articles to be bonded;
    processing at temperatures ranging from about 1900° C. to about 2200° C.; and
    initiating a β→α SiC phase transformation, thereby bonding the SiC articles together.

2. The method of bonding a plurality CVD SIC articles together of claim 1, wherein the interfaces of the articles have flatnesses from about 0.0013 to about 0.025 cm.

3. The method of bonding a plurality CVD SIC articles together of claim 1, further comprising the step of degreasing the articles with an alkaline solution.

4. The method of bonding a plurality CVD SIC articles together of claim 1, further comprising the step of cleaning the articles with an acidic solution.

5. The method of bonding a plurality CVD SIC articles together of claim 4, wherein the acidic solution comprises 30% HF/70% $HNO_3$ at 40 strength in DI H2O.

6. The method of bonding a plurality CVD SIC articles together of claim 1, further comprising the step of generating a vacuum of 100 mBar or less in the furnace.

7. The method of bonding a plurality CVD SIC articles together of claim 1, wherein the step of processing includes ramping from RT to 2150° C. at 10° C./min.

8. The method of bonding at plurality CVD SIC articles together of claim 1, further comprising the step of backfilling the furnace with 500-700 mBar inert gas.

9. The method of bonding a plurality CVD SIC articles together of claim 1, further comprising the step of holding the temperature at about 2150° C. for about 15 minutes.

10. The method of bonding at plurality CVD SIC articles together of claim 9, further comprising the step of ramping from about 2150° C. to about 1950° C. at 10° C./min.

11. The method of bonding a plurality CVD SIC articles together of claim 10, further comprising the step of holding the temperature at about 1950° C. for about 2 hrs to about 4 hrs.

12. The method of bonding a plurality CVD SIC articles together of claim 10, further comprising cooling the articles at a natural decay rate for the furnace.

13. The method of bonding as plurality CVD SIC articles together of claim 1, wherein the step of applying forces comprises applying mechanical pressure with one or more graphite fixtures.

14. The method of bonding a plurality CVD SIC articles together of claim 1, wherein the step of applying forces comprises mechanical pressure with one or more springs.

15. The method of bonding a plurality CVD SIC articles together of claim 13, wherein the graphite has a CTE of at least $4.5 \times 10^{-6}$ $C^{-1}$.

16. The method of bonding a plurality CVD SIC articles together of claim 1, wherein there are no interface materials present between the interfaces of the articles to be bonded.

17. A method bonding a plurality CVD SiC articles together, comprising providing a furnace;

providing a plurality CVD SiC articles to the furnace, wherein the effective separation between the interfaces of the articles is approximately 20 micron or less;

applying forces from about 0.0035 to about 0.035 MPa at the interfaces of the articles to be bonded with one or more graphite fixtures;

processing at temperatures ranging from about 1900° C. to about 2200° C.; and initiating a β→α SiC phase transformation, thereby bonding the SiC articles together.

18. The method of bonding a plurality CVD SIC articles together of claim 17, wherein the graphite has a CTE of at least $4.5 \times 10^{-6}$ $C^{-1}$.

19. The method of bonding a plurality CVD SIC articles together of claim 17, wherein there are no interface materials present between the interfaces of the articles to be bonded.

20. The method of bonding a plurality CVD SIC articles together of claim 17, wherein the processing at temperatures step compromises a two-step sintering regime.

* * * * *